H. D. WEED.
GRIP TREAD ARMOR FOR ELASTIC TIRES.
APPLICATION FILED NOV. 17, 1905.
1,139,388.
Patented May 11, 1915.
2 SHEETS—SHEET 1.
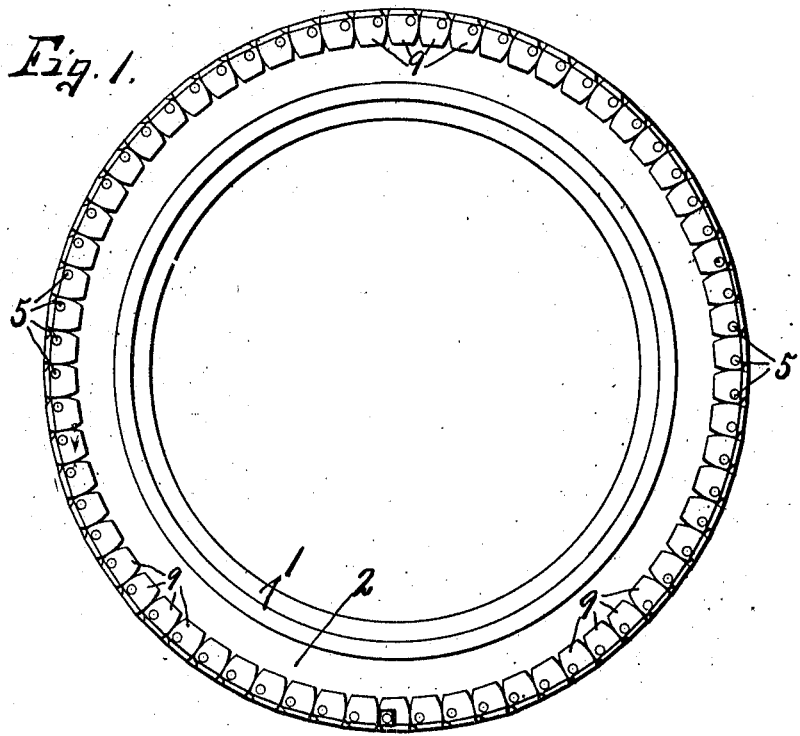
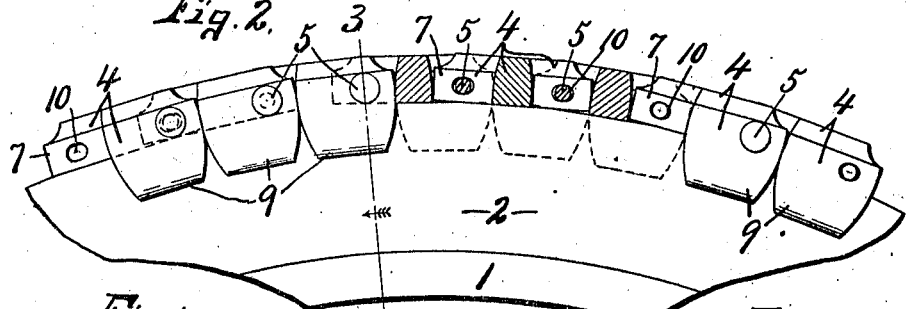
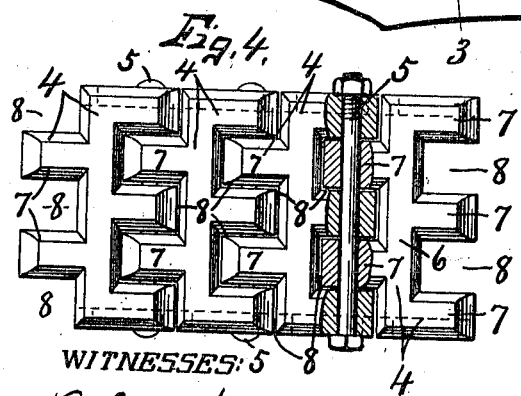
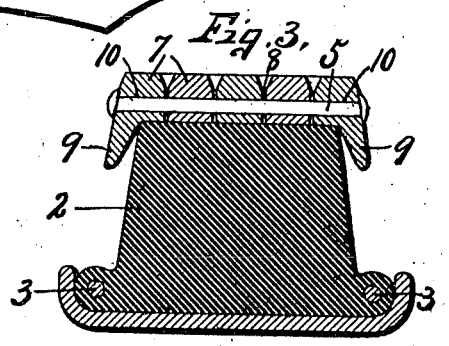
WITNESSES:
B. E. Robinson
H. E. Chase
INVENTOR:
H. D. Weed
BY
Howard P. Denison
ATTORNEY

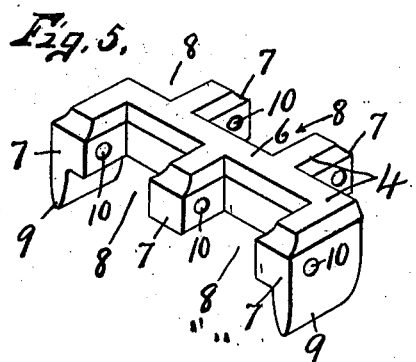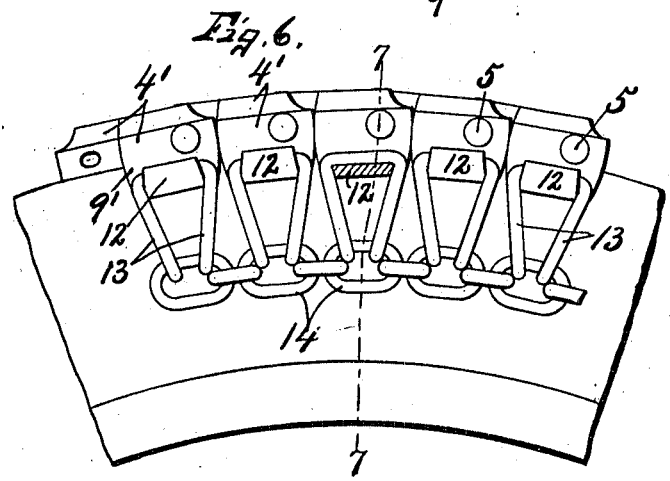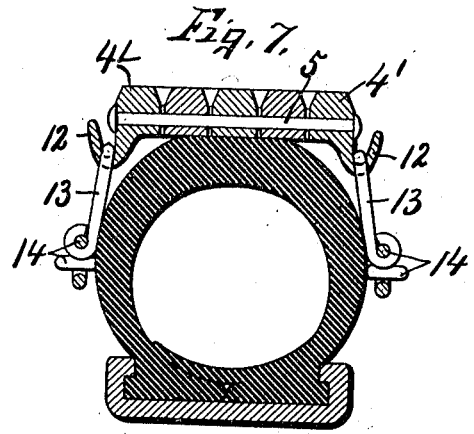

UNITED STATES PATENT OFFICE.

HARRY D. WEED, OF CANASTOTA, NEW YORK, ASSIGNOR TO WALTER B. LASHAR, OF BRIDGEPORT, CONNECTICUT.

GRIP-TREAD ARMOR FOR ELASTIC TIRES.

1,139,388.                Specification of Letters Patent.        Patented May 11, 1915.

Application filed November 17, 1905. Serial No. 287,868.

*To all whom it may concern:*

Be it known that I, HARRY D. WEED, of Canastota, in the county of Madison, in the State of New York, have invented new and useful Improvements in Grip-Tread Armor for Elastic Tires, of which the following, taken in connection with the accompanying drawings, is a full, clear, and exact description.

This invention relates to an improved grip tread armor for elastic tires and is specially adapted for heavy traction wheels of self propelling vehicles in which solid rubber or heavy pneumatic tires are used.

My object is to provide a practically continuous flexible metal tread which is capable of yielding radially at any point and particularly at the ground line by pressure of the superimposed load so that the gripping area on the ground will be proportionate to the load, thereby establishing a continuous gripping contact of comparatively broad area between the surface of the metal shield and road-bed.

Another object is to make the wearing surface of the armor comparatively broad and flat transversely and to provide each section of the armor with opposite radially projecting flanges at the opposite sides of the tire, but spaced apart a greater distance than the transverse width of the adjacent face of the tire to allow for lateral bulging under radial compression.

A further object is to make the several armor sections identical in construction and symmetrical so that all may be cast from the same pattern and interchanged one for the other and to hinge said sections together end to end circumferentially around the periphery of the tire in such manner that the wearing surface of one section extends beyond the contiguous end of the wearing surface of the adjacent section, thereby establishing a continuous wearing surface.

Other objects and uses will be brought out in the following description.

In the drawings:—Figure 1 is a side view of a traction wheel equipped with my improved armor tread. Fig. 2 is an enlarged side view partly in section of a portion of the wheel and tire tread seen in Fig. 1. Fig. 3 is a transverse sectional view taken on line —3—3— of Fig. 2. Fig. 4 is a top plan, partly in section, of a series of, in this instance, four of the armor sections. Fig. 5 is a perspective view of one of said armor sections. Fig. 6 is a side view similar to Fig. 2, showing a slightly modified form of grip tread, and circular side pieces or anchors to which each section of the grip tread is detachably connected. Fig. 7 is a transverse sectional view taken on line —7—7— of Fig. 6.

In demonstrating the practicability of my invention, I have shown in Figs. 1, 2 and 3 a portion of a traction wheel consisting of a rim —1— and solid rubber tire —2— which is mounted in the rim in any well known manner, as seen in Fig. 3, and held in place by circular wires —3—.

The armor tread consists of a series of cast metal wearing plates or sections —4— arranged end to end upon the periphery of the tire —2— and having their adjacent ends pivotally connected to each other by suitable bolts or rivets —5—, one of which may be readily detachable to permit sections of the flexible armor at this point to be detached when placing such armor upon or removing it from the tire.

As shown in the drawings, each of the sections —4— consist of a transverse bar —6— having oppositely projecting tongues —7— which are spaced apart forming intervening grooves or recesses —8—, the tongues at one side of the bar —6— being directly opposite and of substantially the same width as the spaces —8— at the opposite side of the bar, so that the tongues of one section have an easy turning fit in the adjacent grooves or recesses of the next section, said tongues being provided with transverse apertures for receiving the bolts or rivets —5—, whereby the adjacent sections are hinged together, it being understood that sufficient clearance is left between the tongues and ends of the adjacent sections to permit them to rock easily upon their pivots or hinge-bolts.

The outer wearing surfaces of the bar —6— and tongues —7— of each section lie in substantially the same flat plane transversely of the tread, thereby affording a comparatively broad transverse wearing surface adapted to grip into the road-bed to prevent lateral skidding of the wheel and also to increase the traction surface.

The tongues —7— of the adjacent armor sections which are hinged to each other extend circumferentially one beyond the other, thus establishing a continuity of the gripping surface which is extremely important in the use of an armor on heavy traction wheels or where the strain upon the armor is particularly severe, owing to the fact that such strain is distributed over a number of links at the same time and that at no time can the strain be brought upon one link alone.

The marginal edges of the transverse bar —6— and tongues —7— are beveled from the outer face inwardly forming ribs extending transversely of the plates and along the tongues so as to afford a better gripping edge of surface capable of embedding itself into the road-bed under the superimposed load. Each of these sections —4— is preferably provided at its transverse ends with radial flanges —9— which extend inwardly at the opposite sides and are spaced apart a greater distance than the width of the periphery of the tire to allow for lateral bulging of the tire under compression produced by the weight of the superimposed load, such flanges also serving to prevent any possibility of lateral displacement of the armor from the tire.

It will be observed upon reference to Fig. 3 that the periphery of the tire —2— is substantially flat transversely, and I, therefore, make the inner faces of the sections —4— flat transversely to fit closely upon the periphery of the tire.

The front and rear edges of the flanges —9— are curved or convexed to permit the sections to readily flex radially and it is obvious that the portion of the armor engaged with the road-bed will be depressed or flexed inwardly to a greater or less degree, thereby increasing the traction area according to the weight of the superimposed load, the flexibility of the armor being materially increased by making the apertures, as —10—, through which the bolts —5— pass, slightly elongated circumferentially, which also permits the armor sections to adjust themselves closer together when compressed radially at the tread of the superimposed load.

In Figs. 6 and 7 I have shown a slightly modified form of the armor consisting of a series of sections —4'— which are in all respects similar to and are assembled in the same manner as those seen in Figs. 1 to 5 inclusive, except that the opposite inner ends of the flanges, as —9'—, are provided with hook-shaped attaching members —12— for receiving loops or links —13— which in turn are connected to circular side pieces, as chains —14—, the loops —13— being detachably engaged with the hooks —12— to permit the armor sections —4'— to be used with or without the circular side pieces —14—.

The sections of these grip treads are assembled in the manner described to form grip treads of different lengths for tires of different diameters, leaving the sections at one point disconnected so that the tread may be wrapped around the periphery of the tire in the manner shown in Fig. 1, after which the detachable bolt —5—, Fig. 4, is inserted for finally securing the detached ends of the armor together, thereby holding said armor upon the tire.

The armor is drawn tightly against and around the periphery of the tire so as to partially compress the same and it is held from slipping by reason of the fact that the portion engaged with the ground is depressed or flattened radially, thereby breaking the continuity of the circle and affording a lock between the tire and armor.

What I claim is,—

1. In combination with a vehicle wheel having an elastic tire, a grip tread for said tire composed of a series of metal sections arranged circumferentially around and upon the periphery of the tire and having their ends provided with intervening tongues and grooves, the tongues having registering apertures slightly elongated circumferentially, hinge bolts passed through the registering apertures of adjacent tongues to allow the sections to move toward each other when engaging the roadway, said sections having outer flat faces extending along their tongues and also having inner flat faces resting on the periphery of the tire, the opposite ends of each section being provided with inwardly projecting flanges spaced apart from the adjacent sides of the tire, the front and rear edges of the flanges being tapered inwardly to allow flexing action of the tread.

2. A grip tread armor for elastic tires comprising a circular series of wearing plates arranged end to end circumferentially in close juxta-position and having their meeting ends provided with interfitting tongues and grooves and their sides provided with inwardly projecting flanges, the inner faces of the plates between the flanges being substantially flat, and pivotal bolts passed through apertures in the tongues of adjacent plates, the apertures in the tongues being elongated circumferentially to allow the sections to move toward each other when engaging the roadway.

In witness whereof I have hereunto set my hand on this 10th day of November, 1905.

HARRY D. WEED.

Witnesses:
  H. E. CHASE,
  HOWARD DENISON.